(12) United States Patent
Shiraishi

(10) Patent No.: US 8,031,935 B2
(45) Date of Patent: Oct. 4, 2011

(54) METHOD FOR REMOVING COLOR NOISE AND IMAGE-CAPTURING DEVICE THAT USES THIS METHOD

(75) Inventor: Kenji Shiraishi, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1072 days.

(21) Appl. No.: 11/723,370

(22) Filed: Mar. 19, 2007

(65) Prior Publication Data

US 2007/0216951 A1    Sep. 20, 2007

(30) Foreign Application Priority Data

Mar. 20, 2006  (JP) ................................ 2006-075778

(51) Int. Cl.
   *G06K 9/00* (2006.01)
(52) U.S. Cl. ........ 382/163; 382/162; 382/167; 382/260; 382/268; 348/241; 348/537; 348/639; 348/463
(58) Field of Classification Search .................. None
   See application file for complete search history.

(56) References Cited

U.S. PATENT DOCUMENTS

| | | | | |
|---|---|---|---|---|
| 4,594,607 | A * | 6/1986 | Lewis et al. ................. | 348/639 |
| 4,791,488 | A * | 12/1988 | Fukazawa et al. ............ | 348/537 |
| 5,317,420 | A * | 5/1994 | Kuwahara ..................... | 358/463 |
| 5,432,869 | A * | 7/1995 | Matsumoto et al. .......... | 382/274 |
| 5,819,035 | A * | 10/1998 | Devaney et al. .............. | 709/202 |
| 6,028,957 | A * | 2/2000 | Katori et al. .................. | 382/162 |
| 6,636,645 | B1 * | 10/2003 | Yu et al. ........................ | 382/268 |
| 6,731,790 | B1 | 5/2004 | Van de Velde et al. | |
| 7,409,103 | B2 * | 8/2008 | Nishi et al. ................... | 382/275 |
| 2003/0147000 | A1 | 8/2003 | Shiraishi | |
| 2003/0169346 | A1 | 9/2003 | Ojima et al. | |
| 2004/0051908 | A1 | 3/2004 | Curry et al. | |
| 2004/0130632 | A1 | 7/2004 | Shiraishi | |
| 2004/0252224 | A1 | 12/2004 | Shiraishi et al. | |
| 2005/0062854 | A1 | 3/2005 | Shiraishi | |
| 2005/0117036 | A1 * | 6/2005 | Nishi et al. ................... | 348/241 |
| 2005/0134700 | A1 | 6/2005 | Shiraishi | |
| 2005/0135698 | A1 * | 6/2005 | Yatsenko et al. ............. | 382/260 |
| 2005/0135699 | A1 * | 6/2005 | Anderson ..................... | 382/261 |
| 2005/0151874 | A1 | 7/2005 | Shiraishi | |
| 2010/0104180 | A1 * | 4/2010 | Chiang ......................... | 382/167 |

FOREIGN PATENT DOCUMENTS

EP    1411471 A2    4/2004

(Continued)

*Primary Examiner* — Anand Bhatnagar
*Assistant Examiner* — Tsung-Yin Tsai
(74) *Attorney, Agent, or Firm* — Dickstein Shapiro LLP

(57) ABSTRACT

A method for removing color noise on a slowly varying component contained in color difference component image data of image data which is imported from an image sensor and converted to brightness and the color difference component image data, includes the steps of: sampling pixels of said color difference component image data by thinning out according to a first defined sampling format when not performing a color noise removal process on the slowly varying component; determining if the color noise removal process is necessary to be performed or not; producing the color difference component image data, corresponding to a compressed image data size smaller than an image data size without said color noise removal process, by thinning out according to a second defined sampling format when performing said color noise removal process; and recording the color difference and brightness component image data.

6 Claims, 17 Drawing Sheets

FOREIGN PATENT DOCUMENTS

| | | |
|---|---|---|
| JP | 2001-177731 A | 6/2001 |
| JP | 2001-189944 A | 7/2001 |
| JP | 2001-223941 A | 8/2001 |
| JP | 2002-095009 A | 3/2002 |
| JP | 2004-159176 A | 6/2004 |
| JP | 2004-222175 A | 8/2004 |
| JP | 2004-242045 A | 8/2004 |
| JP | 2004-242046 A | 8/2004 |
| JP | 2004-349827 A | 12/2004 |
| JP | 2004-357343 A | 12/2004 |
| JP | 2005-065054 A | 3/2005 |
| JP | 2005-151374 A | 6/2005 |
| JP | 3743389 | 11/2005 |
| JP | 2006-033496 A | 2/2006 |
| JP | 2006-081221 A | 3/2006 |
| JP | 2006-139294 A | 6/2006 |
| JP | 2006-243410 A | 9/2006 |
| JP | 2006-252356 A | 9/2006 |
| JP | 2006-253970 A | 9/2006 |
| JP | 2006-320010 A | 11/2006 |
| JP | 2006-345388 A | 12/2006 |
| JP | 2007-005887 A | 1/2007 |
| JP | 2007-104408 A | 4/2007 |
| JP | 2007-104564 A | 4/2007 |
| JP | 2007-110470 A | 4/2007 |

* cited by examiner

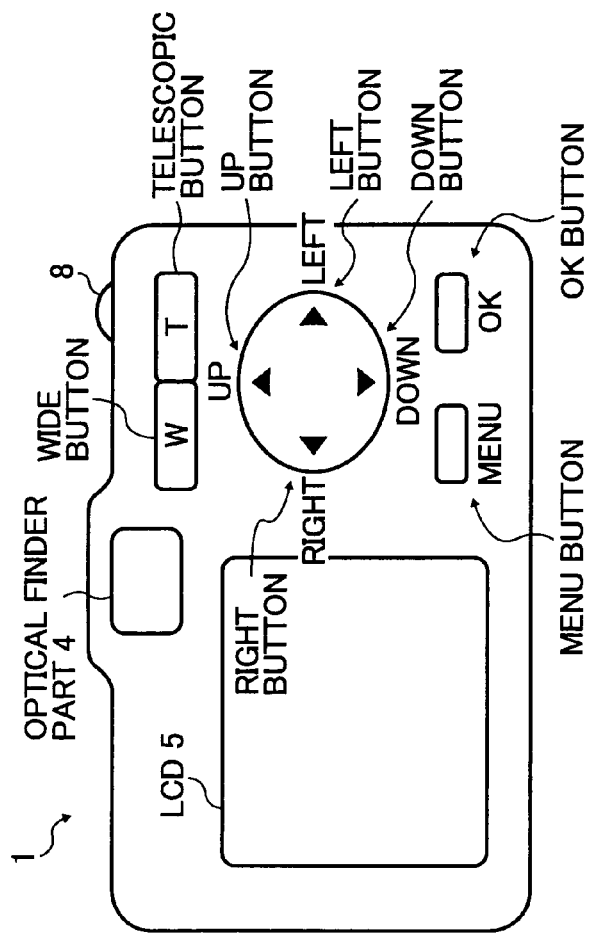
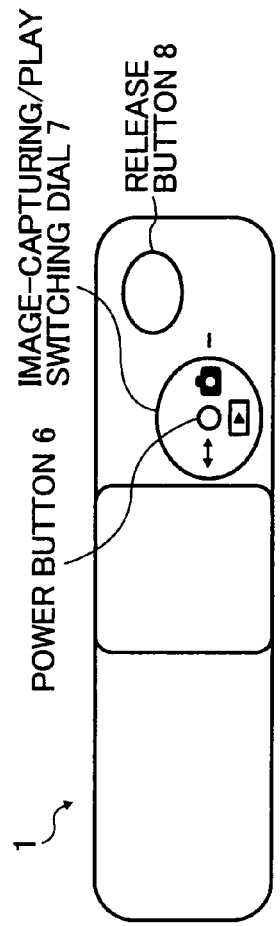
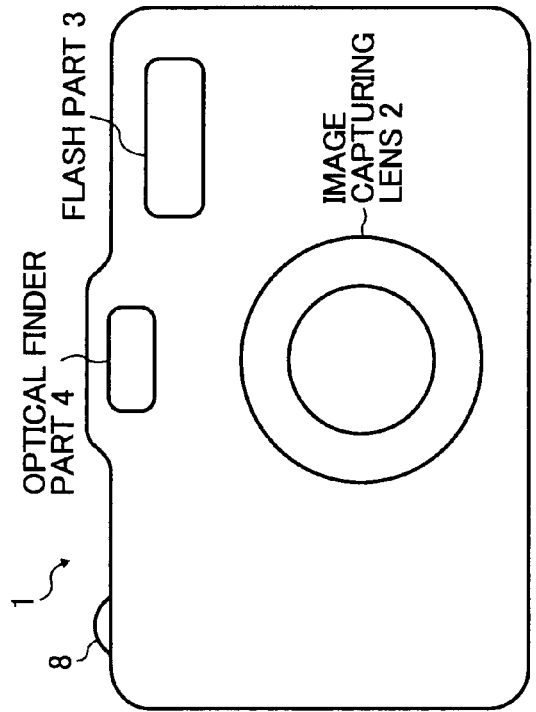

FIG. 3A

| | | | | |
|---|---|---|---|---|
| D (i−2,j−2) | D (i−1,j−2) | D (i,j−2) | D (i+1,j−2) | D (i+2,j−2) |
| D (i−2,j−1) | D (i−1,j−1) | D (i,j−1) | D (i+1,j−1) | D (i+2,j−1) |
| D (i−2,j) | D (i−1,j) | D (i, j) | D (i+1,j) | D (i+2,j) |
| D (i−2,j+1) | D (i−1,j+1) | D (i,j+1) | D (i+1,j+1) | D (i+2,j+1) |
| D (i−2,j+2) | D (i−1,j+2) | D (i,j+2) | D (i+1,j+2) | D (i+2,j+2) |

A STATE OF ARRAY (D) OF A RELATED PIXEL
IN THE NEIGHBORHOOD OF A FOCUSED PIXEL.

FIG. 3B

| | | | | |
|---|---|---|---|---|
| k (i−2,j−2) | k (i−1,j−2) | k (i,j−2) | k (i+1,j−2) | k (i+2,j−2) |
| k (i−2,j−1) | k (i−1,j−1) | k (i,j−1) | k (i+1,j−1) | k (i+2,j−1) |
| k (i−2,j) | k (i−1,j) | k (i, j) | k (i+1,j) | k (i+2,j) |
| k (i−2,j+1) | k (i−1,j+1) | k (i,j+1) | k (i+1,j+1) | k (i+2,j+1) |
| k (i−2,j+2) | k (i−1,j+2) | k (i,j+2) | k (i+1,j+2) | k (i+2,j+2) |

ARRAY STATE OF A COEFFICIENT k OF THE FILTER
USED FOR THE RELATED PIXEL ILLUSTRATED IN FIG. 3A.

AN EXAMPLE OF SIMPLY
THINNING OUT (420)

AN EXAMPLE OF SIMPLY
THINNING OUT (422)

AN EXAMPLE OF THINNING
OUT BY AVERAGING (420)

AN EXAMPLE OF THINNING
OUT BY AVERAGING (422)

420

COLOR
DIFFERENCE Cb, Cr

422

COLOR
DIFFERENCE Cb, Cr

METHOD FOR REMOVING COLOR NOISE AND IMAGE-CAPTURING DEVICE THAT USES THIS METHOD

BACKGROUND

1. Field of the Invention

The present invention relates to a method of removing color noise and to an improvement in an image-capturing device that uses this method.

An image-capturing device such as a digital still camera or the like generates image data for one frame by performing processes on an image signal derived from an image sensor as follows: an analog to digital conversion, an analog gain control (AGC), a gamma control, and a signal process such as an image data process which converts the image data into brightness component image data and color difference component image data. A noise component that originates in the image sensor and originates in an intermediate process is included in the image data generated as described.

2. Description of the Related Art

As a conventional method of removing color noise of image data, Japanese Patent Publication No. 2001-189944 discloses a structure configured to separate the image data into brightness component image data and color difference component image data, and change an intensity of a noise reduction in consideration of a spatial correlation between the data. Japanese Patent Publication No. 2004-159176 discloses a structure configured to delete noise of a color component by using a different method of removing the noise on each color of RGB (red, green and blue) without affecting a resolution of the image. Japanese Patent Publication No. 2001-223941 discloses a structure configured to change a degree of the noise reduction according to its importance on a screen. Japanese Patent Publication No. 2001-223941 discloses a structure configured to change a thinning out rate of the color difference component image data according to a state of a photographic subject or a compressibility setting when compressing the data, whereby a volume of information on the brightness component image data side is increased and compression warp noise is reduced. Japanese Patent Publication No. 2002-95009 discloses a structure configured to reduce the noise by shrinking once reproduction image data read out from a recording medium and expanded, and then expanding the data to a previous size.

In the image-capturing device which uses the image sensor such as a CCD or the like, miniaturization of the image-capturing device and an increase in the number of pixels of the image-capturing device have been progressed, and the size of each unit in a light-receiving part of the image sensor has become smaller, so a light-receiving area of the light-receiving part has also become smaller, therefore reduction in a S/N ratio caused by a decrease in an amount of light received has been problematic.

Moreover, there is also reduction in the S/N ratio that originates in enlarging a gain of a signal amplification circuit for raising an image signal level when the photographic subject has low illuminance.

Each of the noises is not a specific pattern, but is a so-called random noise generated in a random manner. A smoothing process is usually performed for removing the random noises.

In addition, when comparing spatial frequencies of the noises between the brightness component and the color difference component (color component), because a frequency of the color noise is low, an effect of noise removal is not achieved without an enlargement of a size of a filter used for the smoothing process.

However, a circuit scale increases along with the enlargement of the filter size for removing the color noise, which results in an increase in cost of LSI. Moreover, power consumption also increases in a process with the filter, and a time inconvenience in a process for removing the color noise is caused.

SUMMARY OF THE INVENTION

An object of the present invention is to provide an image-capturing device that uses a method of removing color noise, and also to provide the method of removing the color noise of a photographic image that is able to achieve an effect of noise reduction on color noise of a slowly varying component which is not removed by a smoothing filter of a small size of a window, simultaneously leading to no circuit scale increase and no decrease at a noise processing speed.

To accomplish the above object, a method of removing color noise of image data according to one embodiment of present invention includes a method of the color noise in the slowly varying component included in color difference component image data of image data which is captured by an image sensor and is converted into brightness component image data and the color difference component image data and includes:

a first sampling step on the color difference component such that pixels of the above-mentioned color difference component image data are thinned out and sampled according to a first predetermined sampling format when a color noise removal process of a slowly varying component is not performed;

a determination step of determining whether to perform the color noise removal process of the slowly varying component;

a second sampling step of the color difference component that generates the color difference component image data in a small data volume corresponding to a compressed image size where the above-mentioned color noise removal process on the slowly varying component is performed and the pixels of the above-mentioned color difference component image data above-mentioned are thinned out according to a second predetermined sampling format, being smaller than the image size where the color noise removal process on the slowly varying component is not performed;

a recording step of recording color difference component image data and the above-mentioned brightness component image data in the small data volume corresponding to the compressed image size, being generated by the second sampling step of the color difference component.

According to the present invention set forth above, since it is possible for a color noise reduction on a slowly varying component, which requires a large window size, to be achieved only by switching a sampling rate, it is possible to achieve cost reduction and energy-saving of a device by means of a downsized circuit size. In addition, it is possible to reduce data volume to be processed in the color noise reduction, so that it is also possible to achieve speeding up of the color noise reduction process.

BRIEF DESCRIPTION OF THE DRAWINGS

FIG. 1 illustrates an example of a digital camera used for a method of removing a color noise of a slowly varying component according to embodiments of the present invention. FIG. 1A is a front elevation of the digital camera. FIG. 1B is a back view of the digital camera. FIG. 1C is an upper chart of the digital camera.

FIG. 3 is an explanatory drawing of a filter used for a low-pass filter illustrated in FIG. 2 according to the embodiments of the present invention. FIG. 3A illustrates an array state of a related pixel in the neighborhood of a focused pixel. FIG. 3B illustrates the array state of a coefficient of the filter used for the related pixel illustrated in FIG. 3A.

FIG. 4 is an explanatory drawing of sampling brightness component pixel data and color difference component pixel data according to the embodiments of the present invention.

DETAILED DESCRIPTION OF THE PREFERRED EMBODIMENTS

Embodiments of the present invention, a method of removing color noise according to the present invention and an application of an image capturing device using this method to a digital camera, will be explained hereinafter by referring to drawings.

Figure 2:
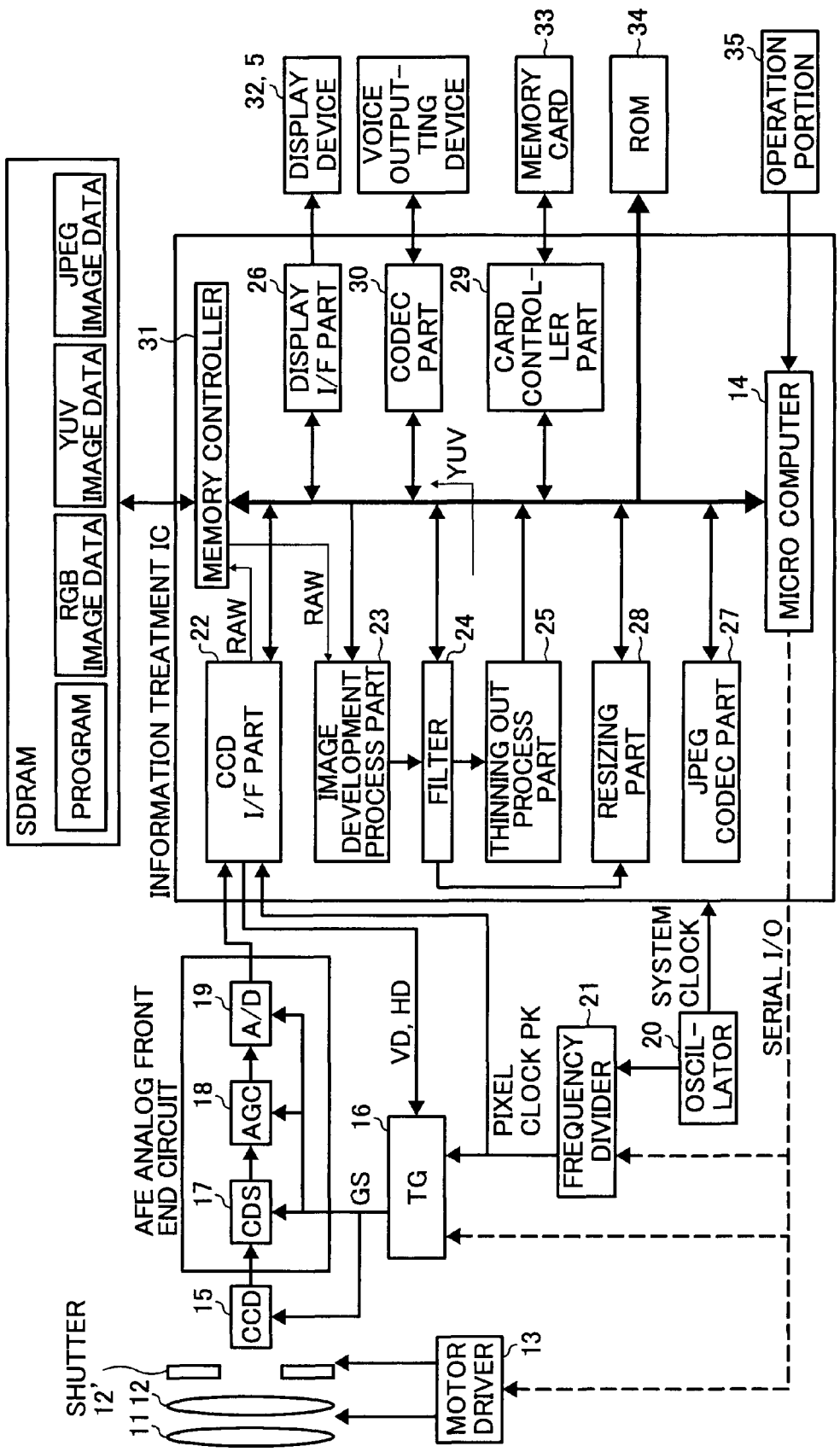
FIG. 2 is a block chart which illustrates a circuit configuration of the digital camera illustrated in FIG. 1 according to embodiments of the present invention.

FIG. 1A illustrates a front elevation of a digital camera. FIG. 1B illustrates a back view of the digital camera. FIG. 1C illustrates a top view of the digital camera. FIG. 2 is a block diagram, typically illustrating a circuit configuration of the digital camera.

A photographing lens 2, a flash part 3, and an optical viewfinder 4 are provided in a front side of a main camera body 1, as illustrated in FIG. 1A. An LCD 5, a wide button W, a telephoto button T, an up button UP, a down button DOWN, a right button RIGHT, a left button LEFT, a menu button MENU, and a set button OK are provided on a back side of the main camera body 1, as illustrated in FIG. 2B.

A power supply button 6, a photographing/play switch dial 7, and a release button 8 are provided on an upper side of the main camera body 1. Each button or the like includes an operation portion 35.

This operation portion 35 is used by the photographer to operate the image-capturing device, for example, the release button 8 functions as a photographing instruction button, and the wide button W and the telephoto button T, functioning as a zoom button, are used for a magnification setting of an optical zoom and an electronical zoom. The other respective buttons function as various setup buttons to select an exposure mode or the like.

A zoom lens 11, a focus lens 12, and shutter 12' are installed in a lens unit inside the main camera body 1, as illustrated in FIG. 2. The zoom lens 11, the focus lens 12, and the shutter 12' are driven by a motor driver 13. The motor driver 13 is controlled by a microcomputer 14 that composes a part of a signal processing IC. Light for photographing that is able to pass through the zoom lens 11 and the focus lens 12 is led to the photographing part.

The photographing part includes a CCD 15, a timing signal generator 16 (hereafter, called as TG) that drives this CCD 15, a CDS 17 that samples image signals from the CCD 15, an analog gain controller 18 (hereafter, called as AGC) which adjusts a gain of an image signal, and an A/D conversion machine 19 that converts the image signal (analog image data) from the CCD 15 into a digital signal. Here, the CDS 17, the AGC 18, and the A/D conversion machine 19 includes an analogue front-end circuit (hereafter, referred to as AFE).

A system clock from an oscillator 20 is supplied to the signal processing IC, and the clock is supplied to a frequency divider 21 from this oscillator 20. A pixel clock PK for a pixel synchronization obtained by a frequency division in response to an instruction from the microcomputer 14 is supplied to a TG 16 and a CCDI/F part 22 in the signal processing IC based on the clock by the frequency divider 21. Respective driving signals GS are supplied to the CCD 15 and to the AFE from the TG 16 based on the pixel clock PK.

Digital RGB image data input from the A/D conversion machine 19 into the signal processing IC are saved temporarily as RGB image data (called RAW data or intact data) in a frame memory SDRAM as an image storage part via the CCDI/F part 22, The signal processing IC has an image development processing part (conversion part) 23, a filter 24, a thinning out process part (thinning out part) 25, a display I/F part 26, a JPEG codec part 27, a resizing part 28, a card controller part (a record part) 29, a voice codec part 30 and a memory controller 31 in addition to the microcomputer 14 and the CCDI/F part 22.

The CCDI/F part 22 outputs a screen horizontal synchronizing signal (HD) and a screen vertical synchronizing signal (VD), and imports the digital RGB image data output from the A/D conversion machine 19 by matching a timing to those synchronizing signals HD, VD.

The CCDI/F part 22 writes the imported digital RGB image data as RGB image data into the frame memory SDRAM via the memory controller 31.

The image development process part 23 performs a conversion process of the RGB image data temporally saved in the frame memory SDRAM into brightness component image data Y and color difference component image data Cb, Cr based on an image development processing parameter set by the control part (the microcomputer 14).

In the conversion process by the image development process part 23, a set of the brightness component image data Y and the color difference component image data Cb, Cr is produced for every pixel.

The set of the brightness component image data Y and the color difference component image data Cb, Cr produced for every pixel is then transmitted to the filter 24. The filter 24 is, for example, a low-pass filter with a window size set to have a 5×5 matrix, and a noise removal process is performed by this low-pass filter.

FIG. 3A illustrates a positional relationship of a related pixel D when performing a filtering process on a focused target pixel D (i, j) by the filter 24. FIG. 3B illustrates an array of numeral values of a filter coefficient K used for the filtering process on the focused target pixel D (i, j). The numeral value of the filter coefficient K is defined for each of the related pixels.

Filter processed data D'(i, j) is produced on each set of the brightness component image data Y and the color difference component image data Cb, Cr relating to the focused target pixel D(i, j) using a formula as follows.

$$D'(i, j) = \left( \sum_{j=-2}^{2} \sum_{i=-2}^{2} (k(i, j) * D(i, j)) \right) / Dev \quad \text{[Formula 1]}$$

where Dev is a sum of the filter coefficient values.

Here, it is possible to adjust a noise removal effect of the filtering process by adjusting the filter coefficient values.

In a case where no filtering process is performed in the filter 24, for example, if the coefficient k is set as k(i, j)=1 and the coefficients except k(i, j) are set to 0 and the Dev is set to 1, D'(i, j) becomes equal to D(i, j), this being the same as the brightness component image data Y and the color difference component image data Cb, Cr are not processed by the filter 24 but are only just passed through the filter 24.

Next, FIG. 4 illustrates a case where the color difference component image data Cb, Cr that have passed through the filter 24 are transmitted to the thinning out process part (or called the sampling process part) 25, and thinned out and output to the frame memory SDRAM.

FIG. 4 illustrates the thinning out process on the color difference component image data Cb, Cr to the brightness component image data Y.

It is possible for the thinning out process part 25 to switch the sampling rate (thinning out rate) by changing a setting of the microcomputer 14.

FIG. 4 illustrates the relationship between a YUV data (YLTV stands for a generic name of the brightness component image data Y and the color difference component image data Cb, Cr) on each pixel before the thinning out process. FIG. 4A illustrates a sampling rate of 4:4:4, as a defined sampling format; namely, the thinning out rate is 0. FIG. 4B illustrates a sampling rate of 4:2:2, that is removal of pixels on second and fourth columns but no removal of pixels on first and third columns in the corresponding color difference component image data Cb, Cr in relation to each of 16 pixels, a dimetric matrix Z is made of a 4×4 matrix in length and breadth (vertical-horizontal direction) of the brightness component image data Y as a unit, and 8 respective pixels of the color difference component image data Cb, Cr are thinned out in relation to the 16 pixels of the brightness component image data Y, and thus fewer pixels are sampled.

Figure 4A:
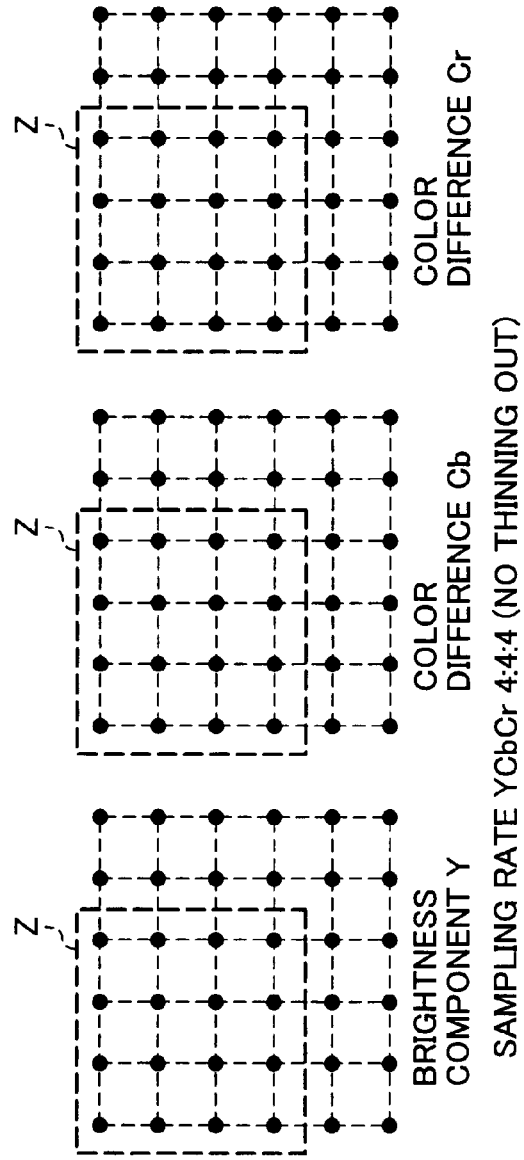
FIG. 4A is an array, chart of brightness component pixel data and color difference component pixel data before the data are sampled.
Figure 4B:
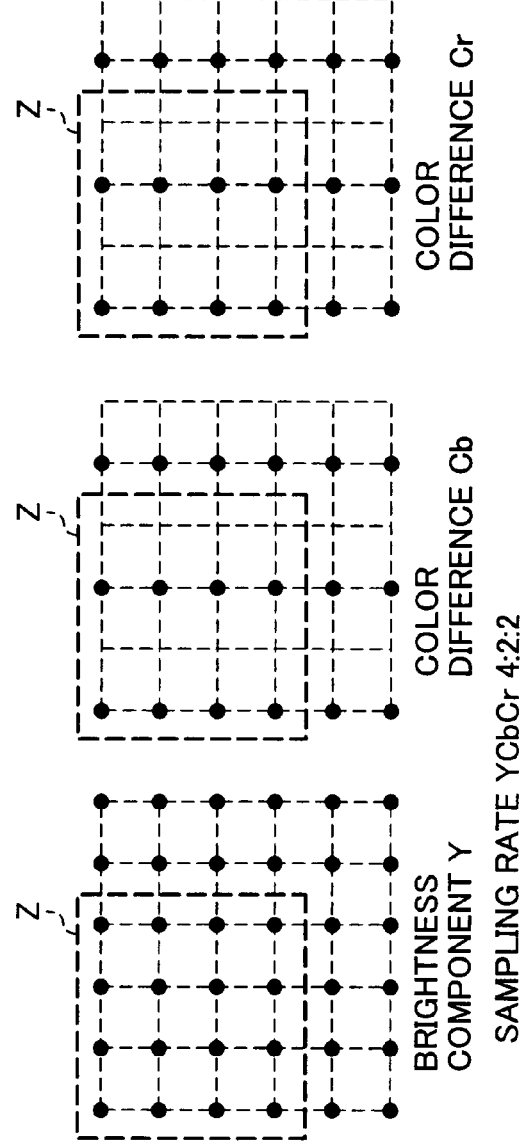
FIG. 4B is an array chart of brightness component pixel data and color difference component pixel data at a sampling rate of 4:2:2.
Figure 4C:
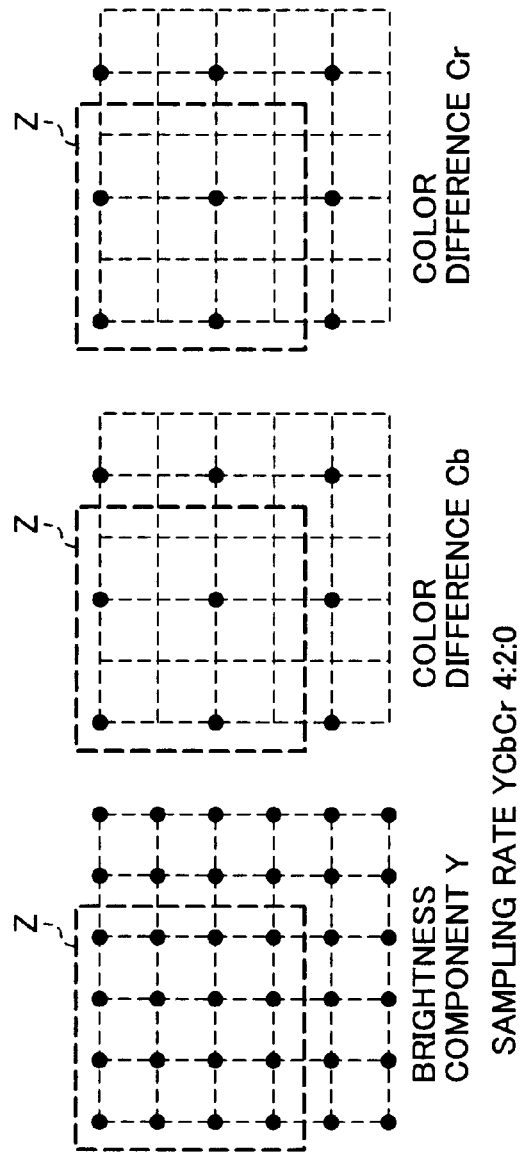
FIG. 4C is an array chart of brightness component pixel data and color difference component pixel data at a sampling rate of 4:2:0.

FIG. 4C illustrates a sampling rate of 4:2:0 as the defined sampling format, that means a removal of pixels on the second and fourth rows and the second and fourth columns, but no removal of pixels on the first columns of the first row and third rows and the first and third rows of the third column, in the corresponding color difference component image data Cb, Cr, in relation to each of the 16 pixels, the dimetric matrix Z is set to have the 4×4 matrix in length and breadth (vertical-horizontal direction) of the brightness component image data Y as the unit, and 12 respective pixels of the color difference component image data Cb, Cr are thinned out in relation to the 16 pixels of the brightness component image data Y, and thus fewer pixels are sampled.

Figure 4D:
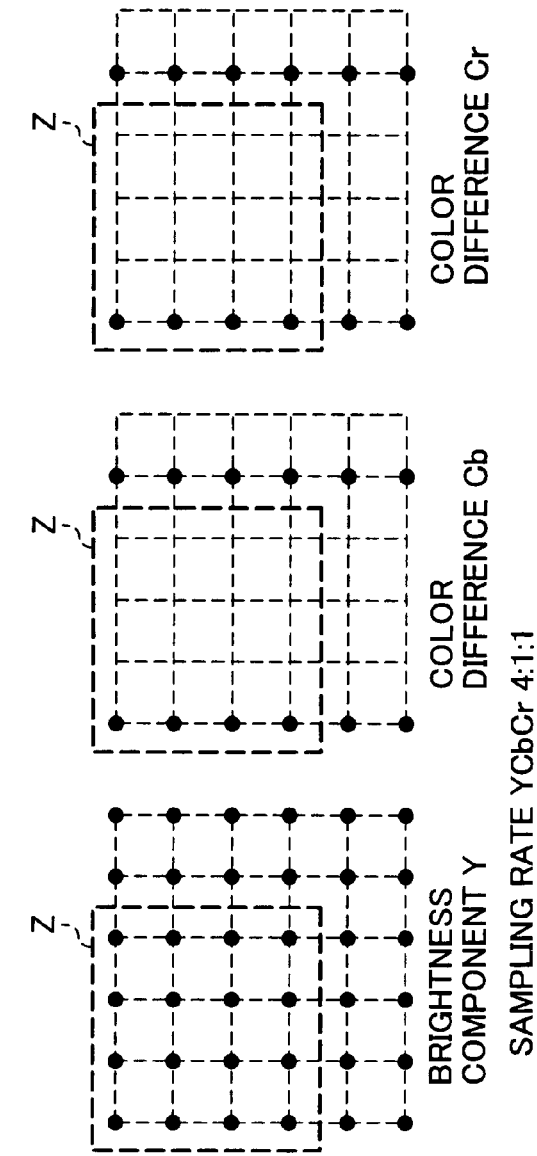
FIG. 4D is an array chart of brightness component pixel data and color difference component pixel data in sampling rate of 4:1:1.

FIG. 4D illustrates sampling rate of 4:1:1 as the defined sampling format, that means a remove of pixels on the second to fourth rows, but no removal of pixels on the first row in the corresponding color difference component image data Cb, Cr in relation to the each of the 16 pixels, the dimetric matrix Z made of the 4×4 matrix in length and breadth (vertical-horizontal direction) of the brightness component image data Y as the unit, and 12 respective pixels of the color difference component image data Cb, Cr are thinned out in relation to the 16 pixels of the brightness component image data Y, and thus fewer pixels than are sampled.

FIG. 5 illustrates examples of the sampling. FIG. 5A is an example of a sampling rate of 4:2:0, which depicts an example of thinning out in which there is no removal of pixels on the first and third rows of the first column and of the first and third rows of the third column, but a simple removal of the other pixels in each of the 16 pixels, and the dimetric matrix Z is set to have the 4×4 matrix as the unit, in relation to the color difference component image data Cb, Cr.

Figure 5A:
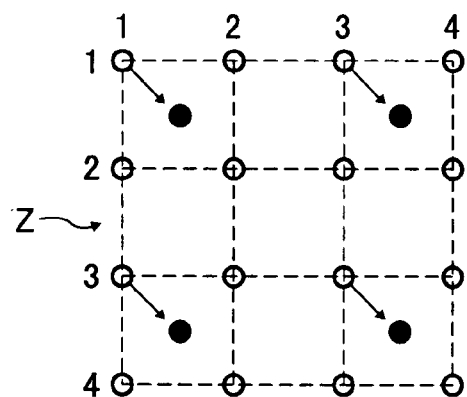
FIG. 5 is an explanatory drawing of a method of sampling brightness component pixel data and color difference component pixel data according to embodiments of the present invention.
FIG. 5B is an explanatory drawing in sampling brightness component pixel data and color difference component pixel data at a sampling rate of 4:2:2 by thinning out simply.
FIG. 5C is an explanatory drawing when sampling brightness component pixel data and color difference component pixel data at a sampling rate of 4:2:0 by thinning out with an averaging procedure.
Figure 5B:
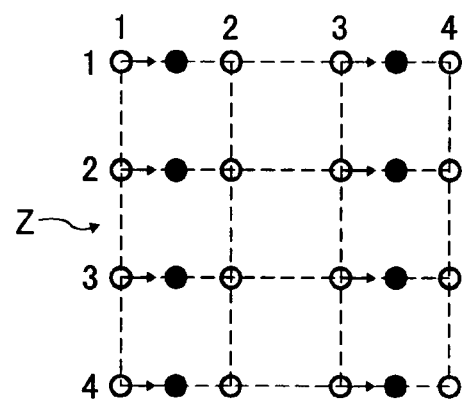

FIG. 5B is an example of a sampling rate of 4:2:2, which depicts an example of thinning out in which there no removal of pixels on the first and third columns, but a simple removal of pixels on the second and fourth columns in each of the 16 pixels, and the dimetric matrix Z is made of the 4×4 matrix as the unit, in relation to the color difference component image data Cb, Cr.

Accordingly, FIGS. 5A and 5B illustrate examples of thinning out peripheral pixels of the target pixels while maintaining the target pixels in the pixels of the color difference component image data according to the defined sampling format.

Figure 5C:
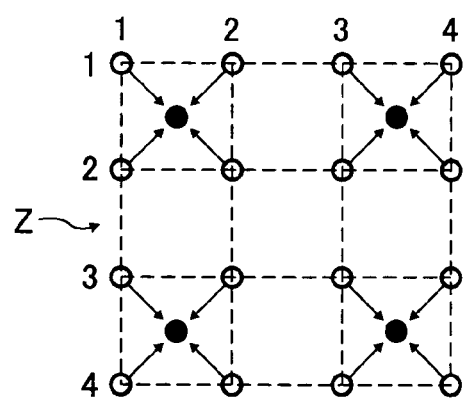

FIG. 5C is an example of thinning out with a sampling rate of 4:2:0 by averaging four pixel data that exists in opposite corners, namely by producing an average data of the first and second rows of the first and second columns, an average data of the first and second rows of the third and fourth columns, an average data of the third and fourth rows of the first and second columns, and an average data of the third and fourth rows of the third and fourth columns, in each of the 16 pixels, the dimetric matrix Z is made of the 4×4 matrix as the unit, in relation to the color difference component image data Cb, Cr.

Figure 5D:
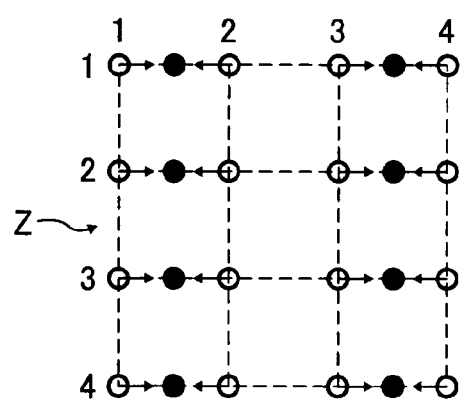

FIG. 5D is an example of thinning out with a sampling rate of 4:2:2 by averaging pixel data on the first and second columns to be average pixel data as a first column, and averaging pixel data on the third and fourth columns to be average pixel data as A second column.

Accordingly, FIGS. 5C and 5D illustrate examples of thinning out, which are equal to thinning out peripheral pixels of the target pixels while maintaining the target pixels that are produced by using the color difference component image data of a plurality of pixels within the pixels of the color difference component image data.

It is possible for the filter 24 to operate alone. It is possible to perform the filtering process with a window size of 5×5 by inputting the brightness component image data Y, the color difference component image data Cb, Cr, and the RAW data as the RGB image data (RAW data), which are in the frame memory SDRAM.

The filter 24 also has a function of outputting a data processed by this filter 24 into the resizing part 28 as a preprocessing when scaling by the resizing part 28.

The set of the brightness component image data Y and the color difference component image data Cb, Cr is read out and then converted to an image size necessary to record, to a thumbnail image, and to an image size suitable for a display or the like by the resizing part 28.

Image data (for example, RGB image data) for the display written in the frame memory SDRAM is transmitted to a display device 32 by the display I/F part 26 and then a photographic image is displayed. The display device 32 is, for example, the LCD 5 included in the digital camera, and it is possible for the image data to be output from the display I/F part 26 as a video signal for TV and to be displayed on a TV screen (not shown).

According to an output device, the display I/F part 26 has a function of adding a synchronous signal and converting the brightness component image data Y and the color difference component image data Cb, Cr, at the sampling rate (thinning out rate) of 4:2:2, into a video signal, a signal for LCD, and the RGB signal or the like.

Figure 6A:
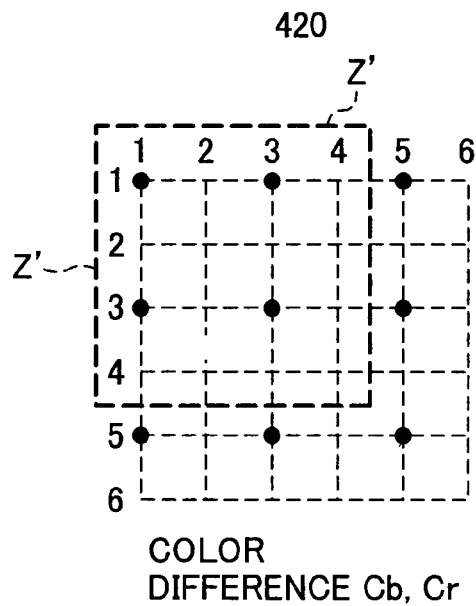
FIG. 6A is an explanatory drawing in sampling brightness component pixel data and color difference component pixel data at a sampling rate of 4:2:0 by thinning out simply.
Figure 6B:
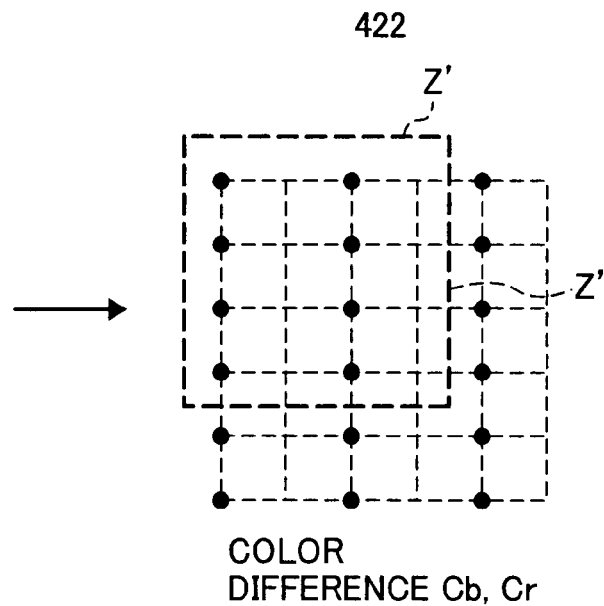
FIG. 6 is an explanatory drawing that illustrates one example in a case where color difference component image data at a sampling rate of 4:2:2 is generated from color difference component image data thinned out by the sampling rate, according to embodiments of the present invention.

If the brightness component image data Y and the color difference component image data Cb, Cr in the frame memory SDRAM are, for example, in the sampling rate (thinning out rate) of 4:2:0, the color difference component image data on a first column of a second row as illustrated in FIG. 6B is produced by a linear supplementation from the first columns of both the first and third rows, and in the same way, the data on a third column of the second row is produced from third columns of both the first and third rows, these two processes being performed in the color difference component image data Cb, Cr with a dimetric matrix z' is made of a 4×4 matrix as a unit illustrated in FIG. 6A. By repeating this in horizontal and vertical directions, YUV image data is produced at the sampling rate of 4:2:2. This function of the linear supplementation is assigned in a data input part inside a module of the display I/F part 26.

The JPEG codec part 27, when recording, encodes the brightness component image data Y and the color difference component image data Cb, Cr which are written in the frame memory SDRAM, and outputs them as encoded JPEG data, and when playing, decodes the encoded JPEG data read out from a memory card 33 and outputs the decoded data as the brightness component image data Y and the color difference component image data Cb, Cr.

Data (e.g. JPEG file) including the brightness component image data Y and the color difference component image data Cb, Cr in the memory card 33 is read out to the frame memory SDRAM by the card controller part 29, and data including the brightness component image data Y and the color difference component image data Cb, Cr of the frame memory SDRAM are written into the memory card 33, according to a directive of the microcomputer 14.

The microcomputer 14 performs a generalization control over the digital camera. At boot-up of the digital camera, a program and control data stored in a ROM 34 are loaded to the frame memory SDRAM by the microcomputer 14 and the digital camera is then controlled by the microcomputer 14 based on a code of the program.

This microcomputer 14 has a function of performing a photographing operation control, a setting of image development processing parameters of the image development process part 23, the memory control, and a display control, and also to determining normal photographing operation (the photographing operation when the color noise removal process is not performed) or an operation of the color noise removal process (a noise reduction operation mode) in accordance with a directive by each button of the operation portion 35, an external movement directive of a remote control (not shown), and a movement directive by a communication from an external terminal such as a personal computer or the like (not shown).

Here, it is possible for the noise reduction operation mode to be set by operating the menu button MENU as illustrated in FIG. 1 and allowing "the noise reduction operation mode" to be selected in a menu panel displayed on the LCD5.

It is also possible for the noise reduction operation mode to be set according to a photographing setting or a photographing condition. The noise is generated in a random manner, greater sensitivity in photographing results in greater in noise component, for example, in a case of exceeding ISO 400, the noise reduction operation mode is set automatically.

Moreover, if an exposure time is elongated, a difference (the noise) in an output level which originates in a difference in each pixel property or the like in the CCD15 occurs. Since the difference in the output level is greater along with greater of exposure time, for example, if the exposure time is more than 0.5 seconds, the noise reduction operation mode is set automatically.

Moreover, since the noise is generated at the same level regardless of a bright light part or a dark part on the screen, the noise is not substantial because a frequency element is large in a bright light part, although the noise begins to stand out in the dark part because the frequency element is small.

Figure 7:
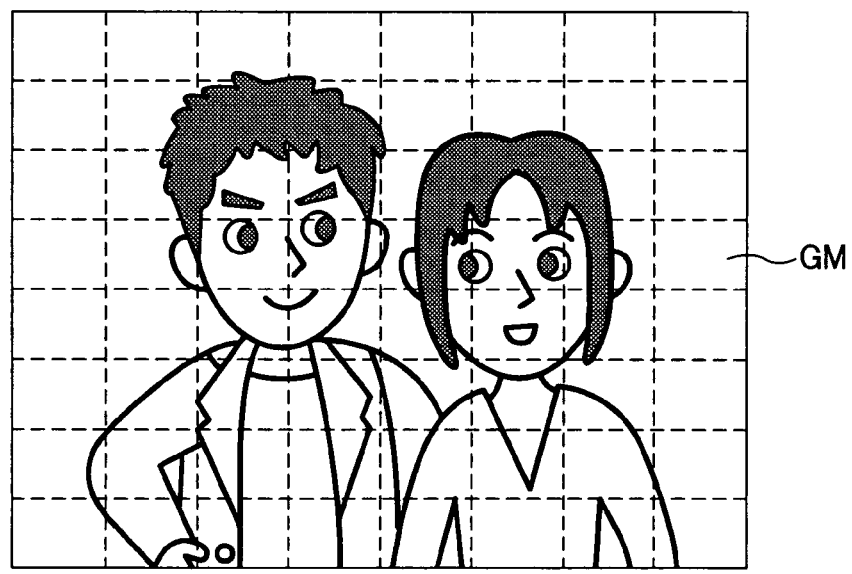
FIG. 7 is an explanatory drawing that illustrates one example of a screen separation to produce a brightness distribution according to embodiments of the present invention.

Then, in a luminance distribution measured by AE photometry, when an area of brightness below constancy exists to a greater than a degree specified one, the noise reduction operation mode is set automatically. For example, in a case where the screen GM is divided into 256 blocks as illustrated in FIG. 7 and the release button 8 is pushed down, if a percentage of the 256 division blocks with an average brightness of 32 or less (if 256 is maximum) is more than 20% in total, the noise reduction operation mode is set (20% of the 266 blocks of the area is 51.2 blocks of the area, but is 52 by rounding it up.).

Figure 8:
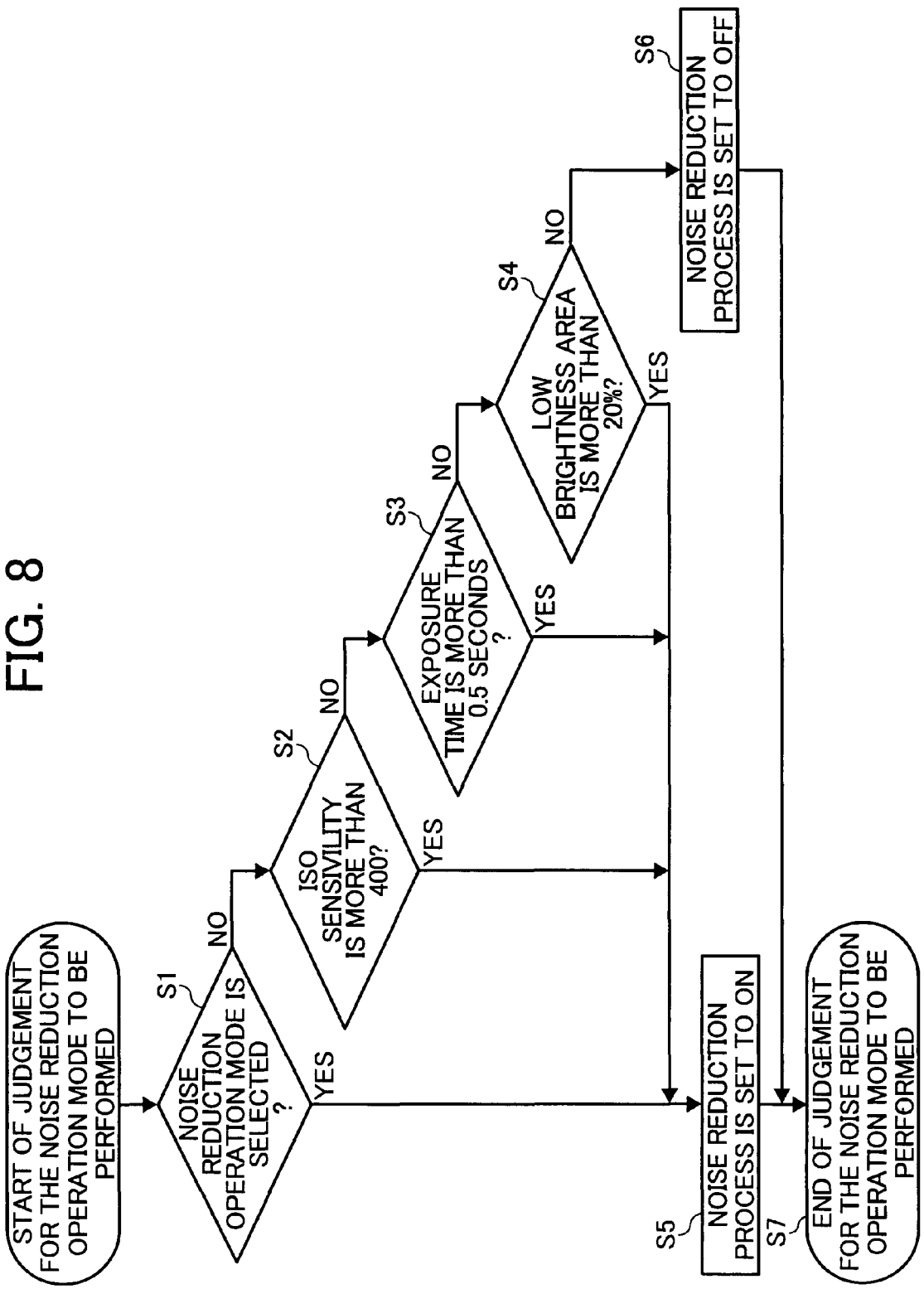
FIG. 8 is a flow chart that illustrates one example of a noise reduction operation mode according to embodiments of the present invention.

FIG. 8 is a flow chart for determining if the noise reduction operation mode is necessary or not, according to those conditions. The microcomputer 14 serves as a device to determine whether this process is necessary.

The next actions (S.1-S.7) are controlled by the microcomputer 14. First, it is determined if the noise reduction operation mode is selected or not in a menu selection screen (S.1). If the noise reduction operation mode is selected, the noise reduction process is set to ON (S.5). In the S.1, if the noise reduction operation mode is not selected, then it is determined if the ISO sensitivity is more than 400 or not (S.2). If the ISO sensitivity is more than 400, the noise reduction process is set to ON (S.5). If the ISO sensitivity is less than 400, then it is determined if the exposure time is more than 0.5 seconds or not (S.3). If the exposure time is more than 0.5 seconds, the noise reduction process is set to ON (S.5). If the exposure time is less than 0.5 seconds, it is determined if a low brightness area is more than 20% or not (S.4). If the low brightness area is more than 20%, the noise reduction process is set to ON (S.5). If the low brightness area is less than 20%, the noise reduction process is set to OFF (S.6) and a process for determining if the noise reduction is necessary or not is completed (S.7).

Next, the normal photographing operation will be explained (an operation of taking a picture when the color noise removal process of the slowly varying component is not performed).

Upon switching the picture-reproduction switch dial 7 illustrated in FIG. 1 to "taking a picture" and booting up the digital camera by turning the power supply button 6 on, the zoom lens 11 and the focus lens 12 are extended out to a photographable position, and the LCD 5 serves as an electronic finder so that a monitoring image is displayed on the LCD 5.

While the monitoring image is displayed, an AE (Automatic Exposure) is executed continuously. An image signal is imported from the CCD 15 into the CCDI/F part 22, and then a multiplication of the RGB image data is performed by the CCDI/F part 22. This multiplication of the RGB image data is performed with a division of the screen GM illustrated in FIG. 7. The RGB image data is integrated at each of the 256 division blocks in total into which a screen is divided horizontally and vertically, and the luminance distribution in the screen is made from this integrated value.

By this method for dividing the screen, the luminance distribution and brightness of a main photographic subject are measured. A brightness of a current photographic subject is measured based on this result of the measurement, the exposure time being set now, and a sensitization degree (AGC gain), and then, the exposure time for setting an amount of a suitable exposure, a sensitization degree setting, and a mechanical aperture (shutter) are set.

The AE is executed by changing the exposure time by changing a setting of the number of electronic shutters to TG16, followed by setting the sensitization degree by a setting change to the AGC, and by changing the aperture diameter via the motor driver 13 to adjust the mechanical aperture. A monitoring image is refreshed per 100 milliseconds while displaying the image.

In a state in which the digital camera is activated, if the telephoto button T (the zoom telescopic button) is pushed down, the zoom lens 11 is moved toward a telephoto side (telescopic side). If the wide button (the zoom wide angle button) is pushed down, the zoom lens 11 is moved toward a wide side (a wide angle side).

Figure 9:
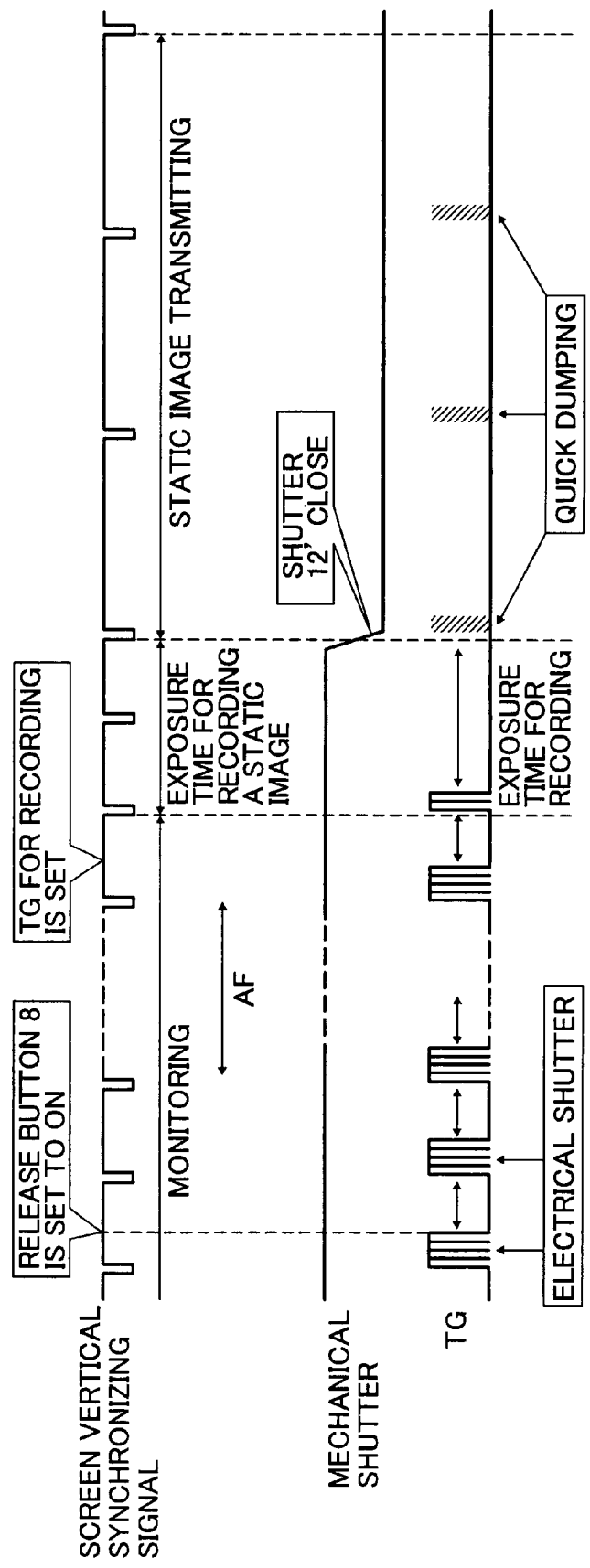
FIG. 9 is a timing chart to explain an operation of a static picture record of the digital camera according to embodiments of the present invention.

FIG. 9 is a known time chart illustrating the recording of a static image. If the release button 8 is pressed down, the focus lens 12 is driven by a directive from the microcomputer 14, for example, a focusing operation such as a CCD·AF based on the principle of an AF system of a contrast detection method is performed, followed by a preparation process for setting the exposure time or the like onto the TG16, and then an exposure process with recording is performed. After the exposure time has passed, the mechanical aperture is closed and then an amount of all pixel RGB data in the CCD 15 is imported into the frame memory SDRAM temporally.

The RGB image data (RAW data) imported into the frame memory SDRAM is transmitted to the image development process part 23 in the signal processing IC, and converted to the brightness component image data Y and the color difference component image data Cb, Cr per each pixel.

After each brightness component image data Y and each color difference component image data Cb, Cr are processed with the low-pass filter, i.e. the filter 24, the thinning out (removal) process at the sampling rate of 4:2:2 (the first defined sampling format) is performed by the thinning out part 25 according to the thinning out method illustrated in FIG. 5B.

Figure 10:
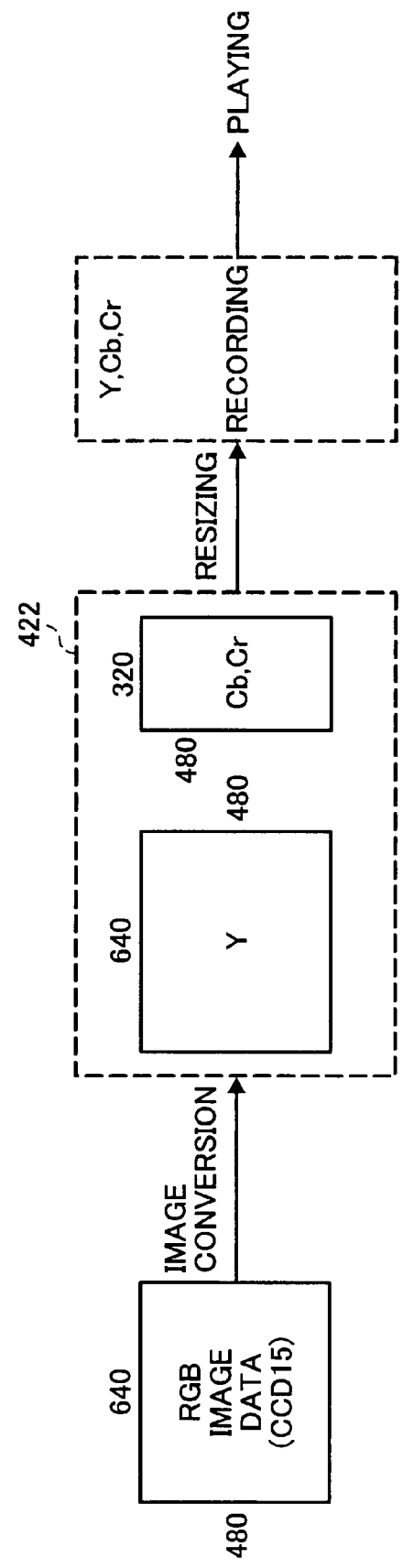
FIG. 10 illustrates a processing method in normal photographing with the digital camera according to embodiments of the present invention.

For example, RGB image data in a VGA image size (height 480 pixels, width 640 pixels) as illustrated in FIG. 10 is converted to the brightness component image data Y and the color difference component image data Cb, Cr, and then, by the thinning out process at the sampling format of 4:2:2, the brightness component image data Y is passed through to be the VGA size without thinning out, and the color difference component image data Cb, Cr are compressed to be a data size corresponding to a smaller data size of a height of 480 pixels and width of 320 pixels.

This process step is a first sampling step of the color difference component, sampling being carried out by thinning out the pixels of the above-mentioned color difference component, image data according to the first defined sampling format in a case in which the removal process on the low frequency color noise is not performed.

The color difference component image data Cb, Cr after being thinned out are converted into a size corresponding to a recorded pixel count by the resize part 28, and encoded into a JPEG format, and after a header information is added, are then saved in the memory card 33 as a JPEG file.

Next, the noise reduction operation mode will be explained.

If the release button 8 is pressed down, it is determined whether the noise reduction process should be performed or not by the microcomputer 14.

Figure 11:
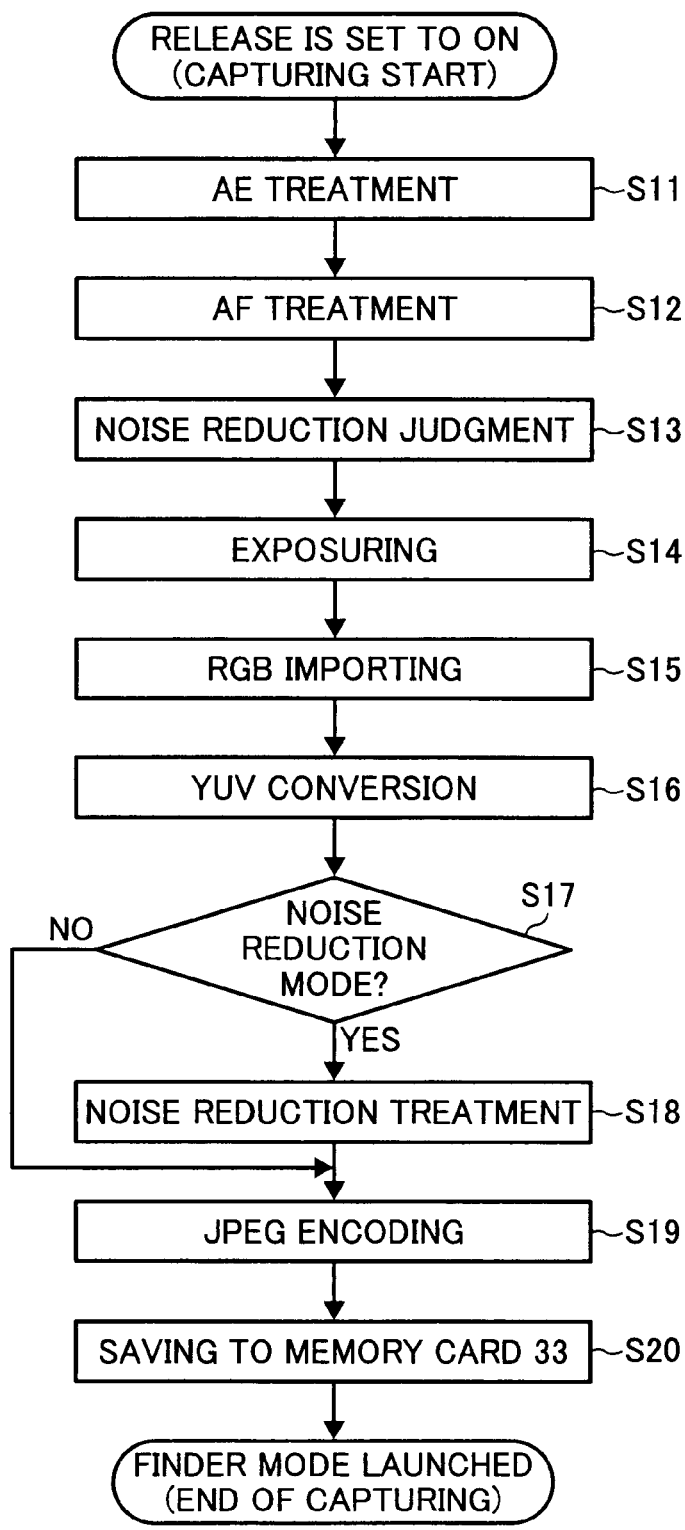
FIG. 11 is a flow chart that illustrates a procedure in normal photographing with the digital camera and a procedure in a process of noise reduction according to embodiments of the present invention.

FIG. 11 illustrates a flow chart of a photographing which includes an execution of the noise reduction operation mode. It is set to change the thinning out rate of the color difference component image data of a recorded image, here. The microcomputer 14 has a function of changing the thinning out rate.

If the release button 8 is pressed down while the monitoring image is displayed on the LCD5, the AE process for exposing of a static image is executed using the integrated value of the RGB image data detected at the time (S.11). Next, an AF process is executed as in the normal photographing operation (S.12), then it is determined if the noise reduction operation mode is necessary to be executed according to a processing procedure in a flow chart illustrated in FIG. 8 just before starting the exposure (S.13).

Next, the exposure process (S.14) is performed and then the RGB image data are read out from the CCD15 and imported into the frame memory SDRAM as the RGB image data (RAW data) (S.16), which are provided to a YUV conversion (S.17).

Next, it is determined whether or not to act on the noise reduction operation mode by the microcomputer 14. Here, it will be explained with the premise that the noise reduction operation mode is selected (S.17).

In the normal photographing operation (the noise reduction is OFF), the thinning out is performed to be a format at the sampling rate of 4:2:2, as illustrated in FIG. 10. Moreover in the noise reduction operation mode (the noise reduction is ON), the thinning out is performed so as to be in a format at the sampling rate of 4:2:0 as a second defined sampling format, as illustrated in FIG. 12.

More particularly, the RGB image data imported into the frame memory SDRAM is transmitted to the image development process part 23 illustrated in FIG. 2 and converted into the brightness component image data Y and the color difference component image data Cb, Cr. At this point, the brightness component image data Y and the color difference component image data Cb, Cr are not thinned out, as illustrated in FIG. 4A.

Next, the brightness component image data Y and the color difference component image data Cb, Cr are processed by the low-pass filter, i.e. the filter 24, and transmitted to the thinning out process part 25. The brightness component image data Y are not thinned out. The thinning out process at the sampling rate of 4:2:0 is performed by the thinning-out part 25 according to a thinning out method illustrated in FIG. 5A.

Figure 12:
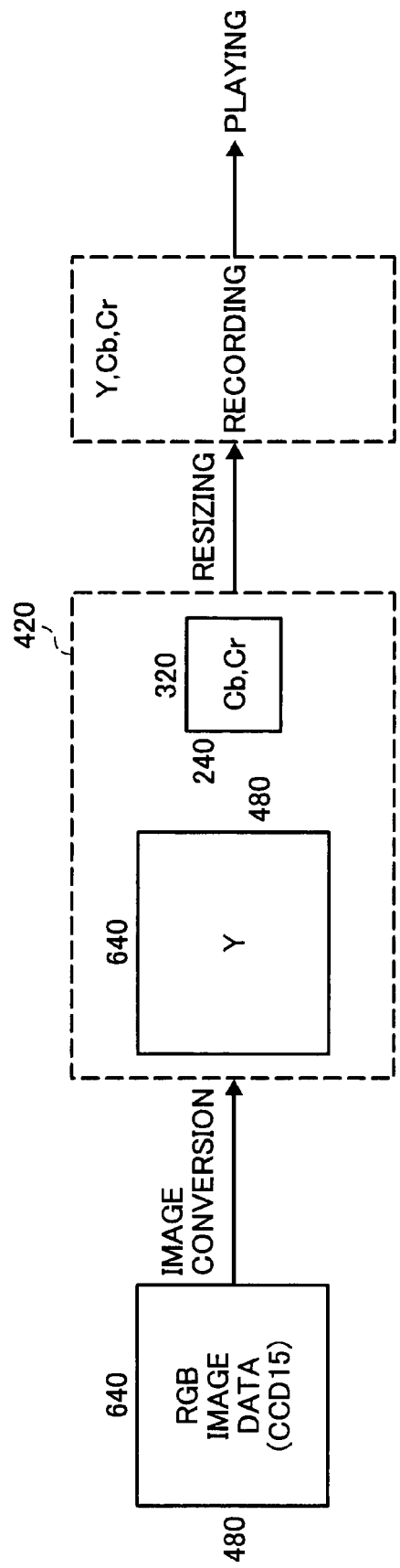
FIG. 12 illustrates a processing method in noise reduction process of a digital camera according to the present invention.

For example, as illustrated in FIG. 12, the RGB image data in VGA image size are converted into the brightness component image data Y and the color difference component image data Cb, Cr, and then, by the thinning out at the sampling format of 4:2:0, the brightness component image data Y are passed through to be the VGA size without thinning out, and the color difference component image data Cb, Cr are compressed to be a size corresponding to a smaller data size of a height of 240 pixels and width of 320 pixels (S.18).

This process step is a second sampling step of the color difference component, thinning out the pixel of the color difference component image data according to the defined second sampling format in a case of performing the color noise removal process on the slowly varying component, and producing the color difference component image data in a small data size corresponding to a compressed image data size smaller than the image data size in a case of not performing the color noise removal process on the slowly varying component.

These thinned out the color difference component image data Cb, Cr are converted into a size corresponding to the recorded pixel count by the resize part 28, and encoded into JPEG format (S.19), and after header information is added, are then saved in the memory card 33 as a JPEG file (S.20).

In the personal computer PC or the like, when displaying the JPEG file, the JPEG file is generally displayed by converting the brightness component image data Y and the color difference component image data Cb, Cr into the RGB image data. The RGB image data is allocated one by one per each pixel in the personal computer PC. A compensation process is performed by using the brightness component image data Y and the color difference component image data Cb, Cr to produce the RGB image data, as illustrated in FIGS. 4B and 4C, and there is a difference between the sampling formats of 4:2:2 and 4:2:0 in a vertical data size of the color difference component image data Cb, Cr, so that a range of a set of the color difference component image data Cb, Cr affecting the color noise in the vertical direction is broadened. That is to say, an effect of the low-pass filter is achieved, which is equal to that achieved when the low-pass filtering is performed over a wider range than usual on color. It is possible to obtain the same effect for displaying on the LCD 5.

The data thinned out to the sampling rate of 4:2:0 is converted to data in the sampling rate of 4:2:2 by the display I/F part 26 using a supplementation process such as the linear supplementation and display data is produced. That is to say, it is equal to that when the low-pass filter process is performed one more time than in a case of the sampling rate of 4:2:2 of the normal photographing operation and the color noise reduction is performed on the color difference component image data.

Broadening a range (window size) of the low-pass filter using hardware results in an increased circuit size and an increased cost. Moreover, an increase in an amount of data to be processed leads to a longer process time together with a redundant electronic power loss. In contrast, it is possible to obtain the color noises reduction effect at low frequency by only adding a process to increase the thinning out rate without adding special hardware for exclusive use in the noise reduction operation mode.

Figure 13:
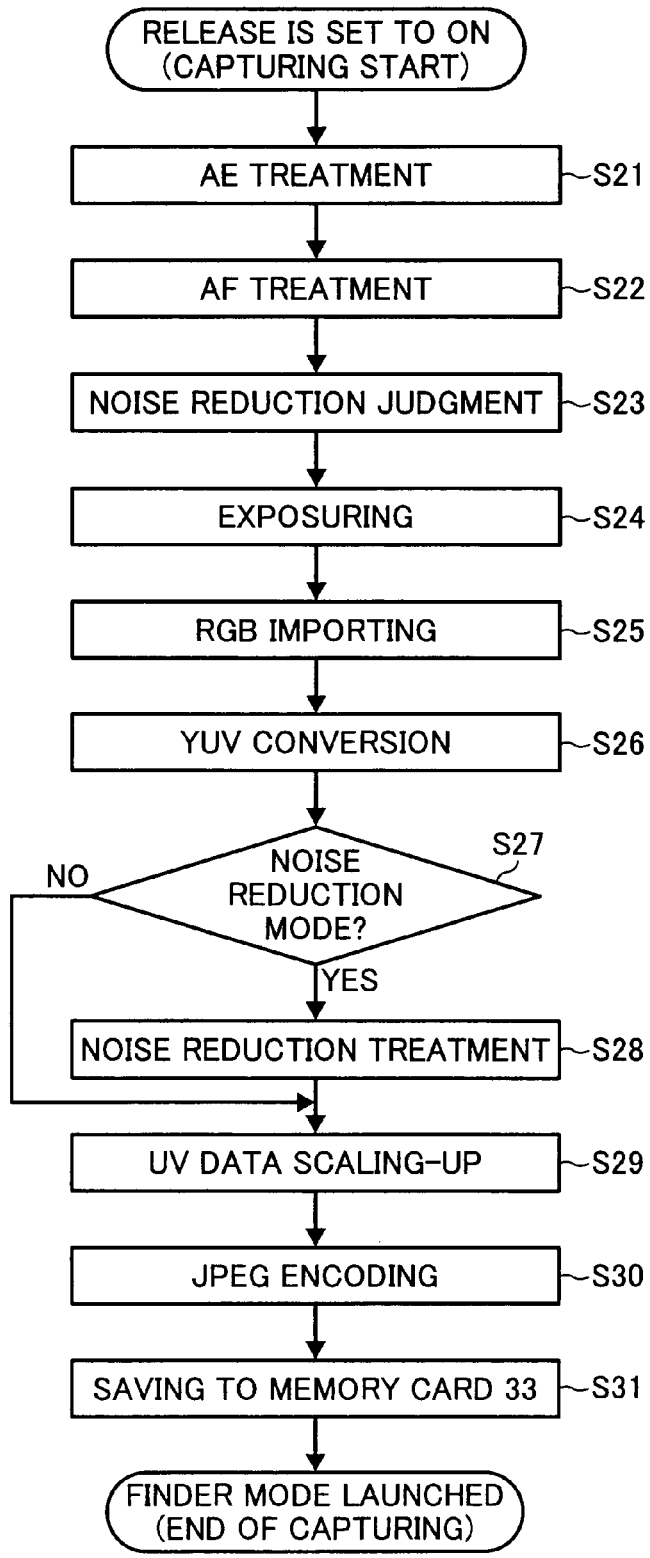
FIG. 13 is a flow chart that illustrates other examples of the digital camera according to embodiments of the present invention, a procedure in normal photographing, and a procedure in a noise reduction process.

FIG. 13 illustrates another example of a flow chart in photographing that includes an execution of the noise reduction operation mode according to the present invention.

In a photographing process with the noise reduction operation mode illustrated in FIG. 13, the thinning out rate of the color difference component image data is switched by the thinning out process, whereas a recording process at recording is performed at the same thinning out rate in both cases in which the noise reduction operation mode is ON/OFF.

With the monitoring image being displayed on the LCD 5 and the release button 8 being pushed down, the AE process for the exposing of the static image is performed by using an integrated value of RGB image data detected at the time (S.21). Next, an AF process is executed as in a normal photographing operation (S.22), then it is determined if the noise reduction operation mode is necessary to be executed according to a processing procedure in a flow chart illustrated in FIG. 8 just before starting the exposure (S.23).

Next, the exposure process (S.24) is performed and the RGB image data are read out from the CCD15 and imported into the frame memory SDRAM as the RGB image data (RAW data) (S.25), which are converted to a YUV conversion (S.26).

Next, it is determined whether the noise reduction process should be performed or not by the microcomputer 14. Here, it will be explained with the premise that the phrase, "noise reduction operation mode ON" is selected (S.27).

In the normal photographing operation (the noise reduction operation mode OFF), thinning out is performed to make the color difference component image data Cb, Cr to be in a format of the sampling rate of 4:2:2 (the first sampling format) as illustrated in FIG. 10. Here, in "noise reduction ON", the thinning out is performed to make the color difference component image data Cb, Cr to be in a format at the sampling rate of 4:2:0 (second sampling format), as illustrated in FIG. 14.

That is to say, the RGB image data imported into the frame memory SDRAM is transmitted to the image development process part 23, as illustrated in FIG. 2, and converted to the brightness component image data Y and the color difference component image data Cb, Cr. At this point, the brightness component image data Y and the color difference component image data Cb, Cr are not thinned out yet, as illustrated in FIG. 4A.

Next, the brightness component image data Y and the color difference component image data Cb, Cr are processed by the low-pass filter, the filter 24, and transmitted to the thinning out process part 25. The brightness component image data Y are not thinned out. The thinning out process at the sampling rate of 4:2:0 is performed by the thinning-out part 25 according to a thinning out method illustrated in FIGS. 5A and 5C.

Figure 14:
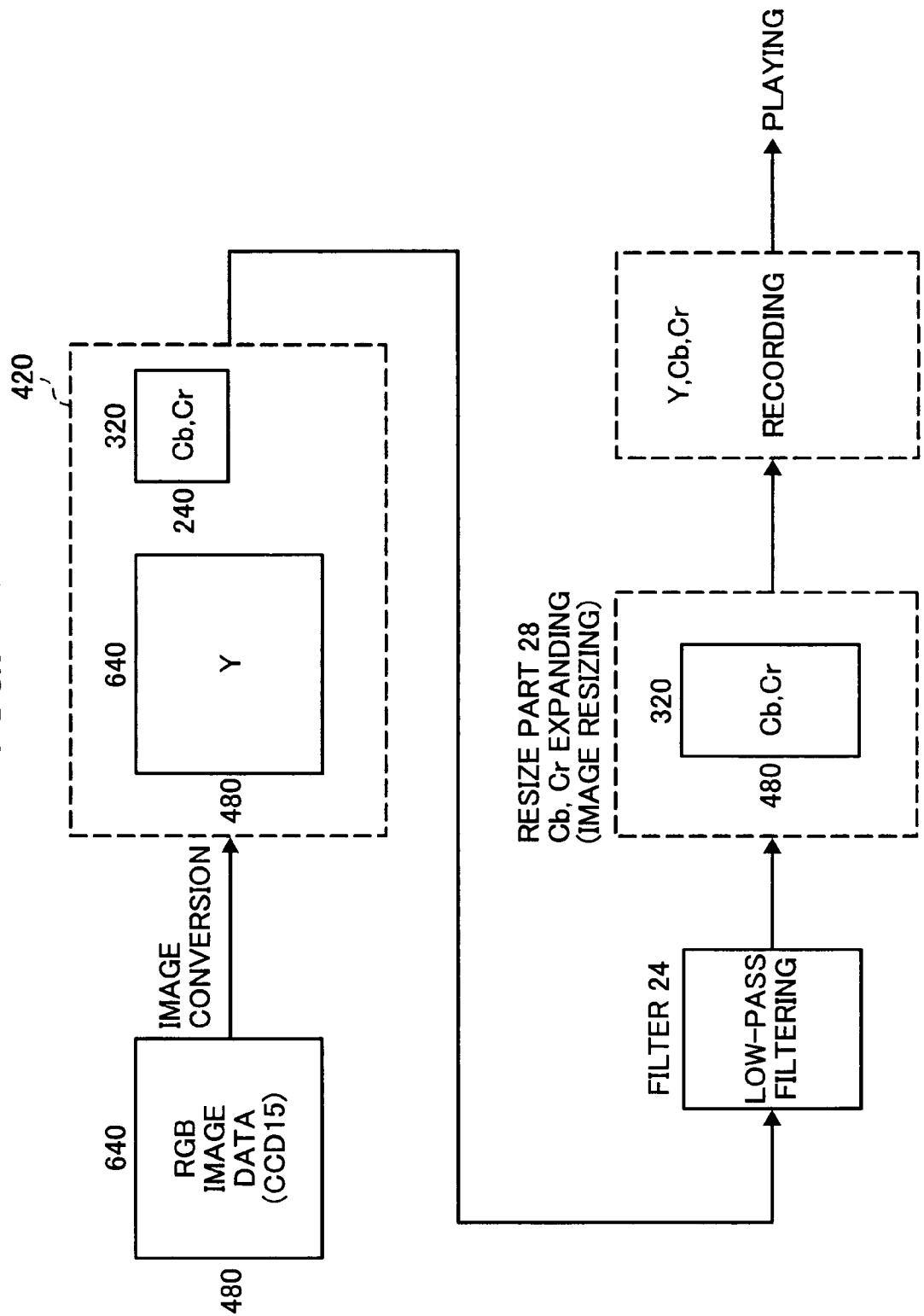
FIG. 14 illustrates another processing method in a noise reduction process of a digital camera according to embodiments of the present invention.

For example, as illustrated in FIG. 14, the RGB image data in VGA image size is converted into the brightness component image data Y and the color difference component image data Cb, Cr, and then, by the thinning out of the sampling format of 4:2:0, the brightness component image data Y is passed through to be the VGA size without thinning out, and a data size of the color difference component image data Cb, Cr is compressed to be a smaller data size corresponding to an image size of a height of 240 pixels and width of 320 pixels (S.28).

Next, these thinned out color difference component image data Cb, Cr (UV data) are processed by the low-pass filter, i.e. the filter 24, using a window size of 5×5 and expanded to a previous image size of a height of 480 and width of 320 by the resize part 28 (S.29). This is an image resizing step.

Next, the brightness component image data Y and the color difference component image data Cb, Cr expanded to the image size of a height of 480 and width of 320 by the resizing part 28 are encoded into JPEG format (S.30), after header information is added, are then saved in the memory card 33 as the JPEG file (S.31).

The color difference component image data Cb, Cr are thinned out to be at the sampling rate of 4:2:0 when the noise reduction operation mode is ON, thus this enlargement of the color difference component image data Cb, Cr is a process that doubles the image size in a vertical direction, being doubled in the vertical direction after the process by the low-pass filter with a length and breadth (horizontal×vertical) of 5×5, this process being equal to a filtering process on an amount of 10 image data in the vertical direction being performed, so it is possible to obtain a greater deletion effect on the low frequency color noise (color noise with a large graininess).

That is to say, it is possible to obtain a color noise reduction effect on the low frequency by only just adding an enlargement process of the color difference component image data Cb, Cr and adding a process of increasing the thinning out rate on the noise reduction operation mode without the necessity to add a special hardware for an exclusive use according to this embodiment.

In a case of the noise reduction process in an embodiment illustrated in FIG. 11, there is a possibility of the noise reduction effect changing depending on a playing method of the player side even though a recording process is speedy, but according to an embodiment illustrated in FIG. 13, there is an advantage of obtaining the same effect of the noise reduction process in the embodiment as illustrated in FIG. 11 independent of the playing method on the player side.

Figure 15:
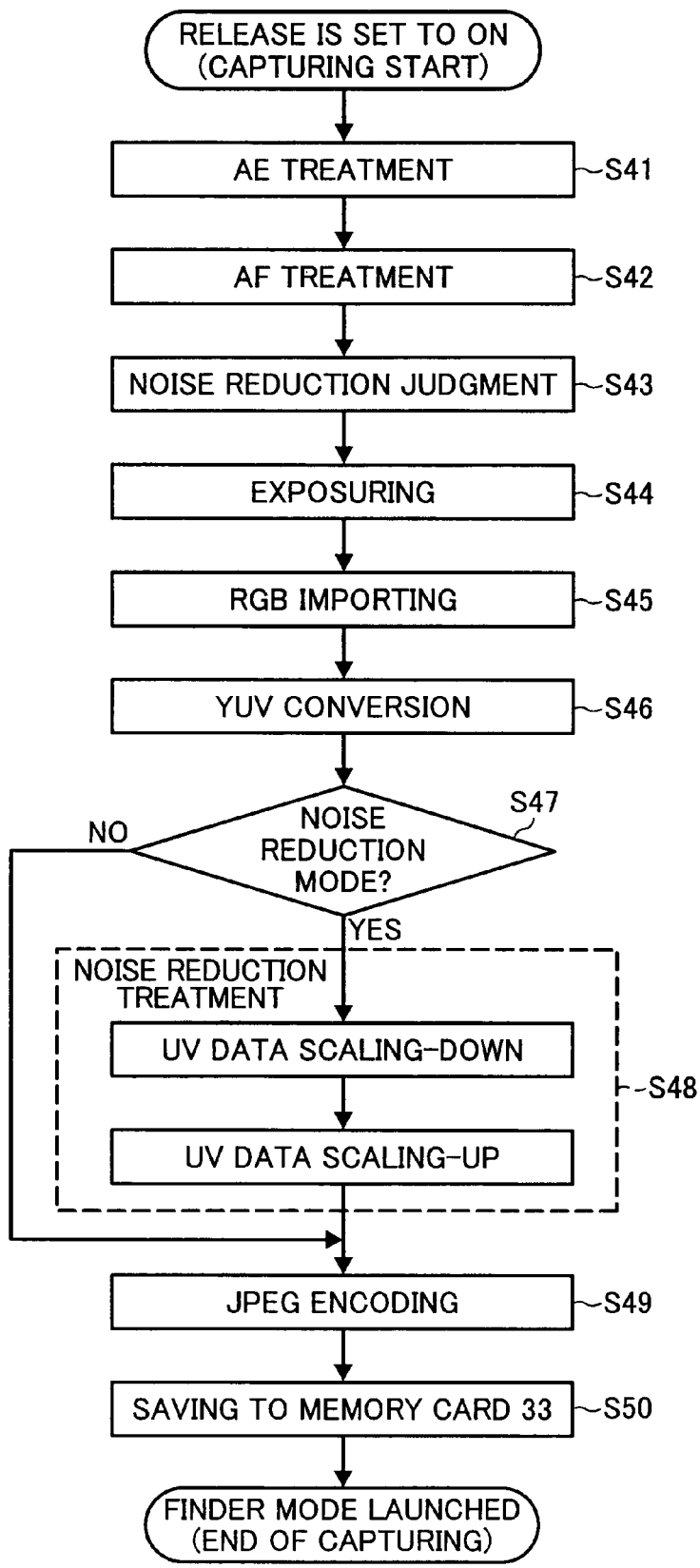
FIG. 15 is a flow chart of the digital camera according to embodiments of the present invention that illustrates another example further, a procedure in normal photographing and a procedure in a noise reduction process.

FIG. 15 illustrates further another example of a flow chart in a photographing that includes the execution of the noise reduction operation mode according to the present invention more.

A photographing process with the noise reduction operation mode illustrated in FIG. 15 also changes a pixel count of the color difference component image data Cb, Cr by an image size reduction processing, and the image data, is recorded in a same pixel count in both cases in which the noise reduction operation mode is ON/OFF.

With the monitoring image being displayed on the LCD 5, if the release button 8 is pressed down, the AE process for the static image exposure is performed using an integrated value of RGB image data detected at the time (S.41). Next, an AF process is executed the same as a normal photographing operation (S.42), then it is determined if the noise reduction operation mode is necessary to be executed according to a processing procedure in a flow chart illustrated in FIG. 8 just before starting the exposure (S.43).

Next, the exposure process (S.44) is performed and the RGB image data is read out from the CCD 15 and imported into the frame memory SDRAM as the RGB image data (RAW data) (S.45) which is converted to a YUV conversion (S.46).

Next, it is determined whether the noise reduction process should be performed or not by the microcomputer 14. Here, it will be explained with a premise that the "noise reduction operation mode ON" is selected (S.47).

Figure 16:
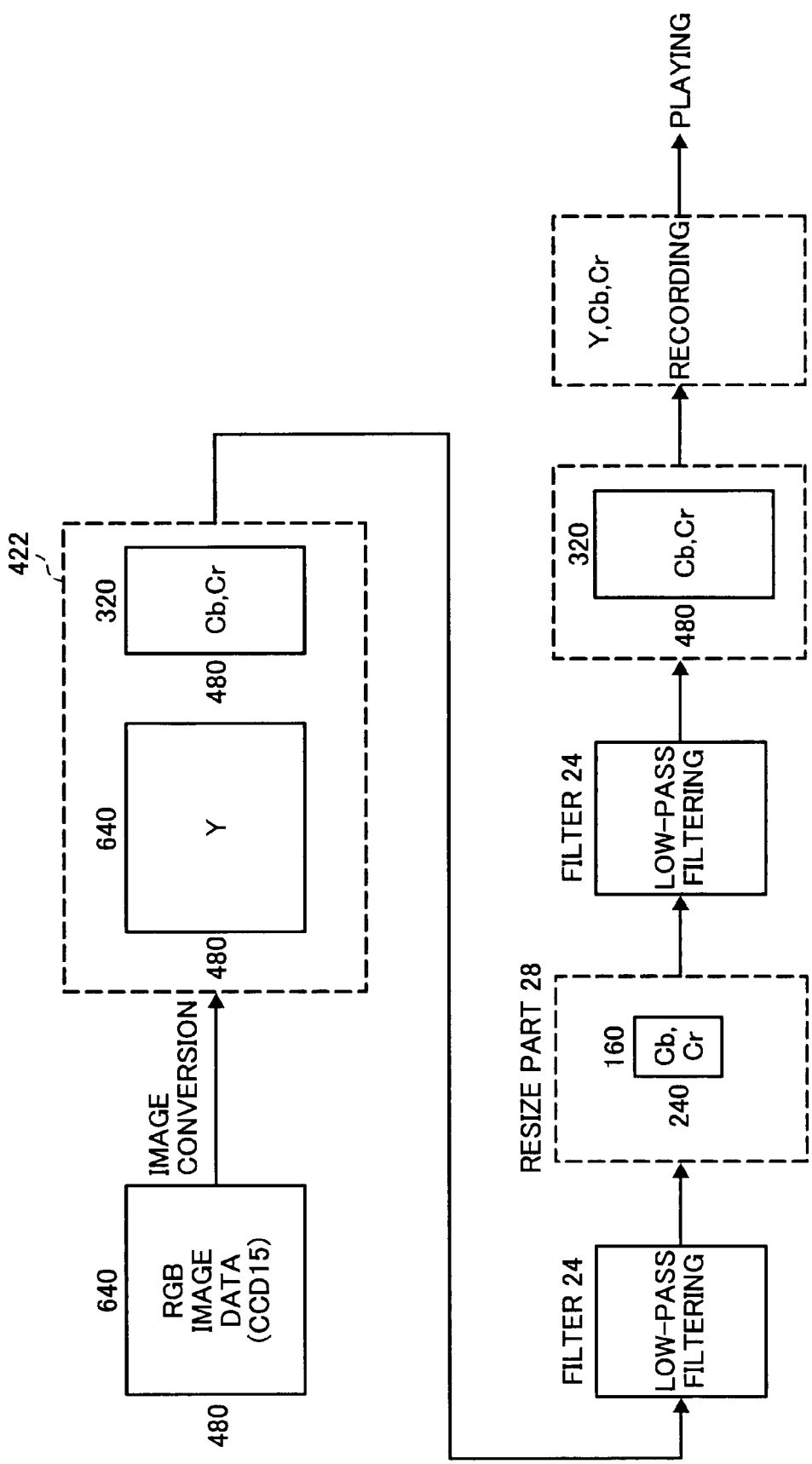
FIG. 16 further illustrates another processing method in a noise reduction process of a digital camera according to embodiments of the present invention.

When the noise reduction operation mode is ON, the thinning out is performed to make the color difference component image data Cb, Cr to be in a format of the sampling rate of 4:2:2 as illustrated in FIG. 16, that is to say, it is a same thinning out rate independent of whether the noise reduction operation mode is ON/OFF.

That is to say, the RGB image data imported into the frame memory SDRAM is transmitted to the image development process part 23 illustrated in FIG. 2, and converted to the brightness component image data Y and the color difference component image data Cb, Cr. That is to say, at this point, the brightness component image data Y and the color difference component image data Cb, Cr are not thinned out as illustrated in FIG. 4A.

Next, the brightness component image data Y and the color difference component image data Cb, Cr are processed by the low-pass filter, i.e. the filter 24, and transmitted to the thinning out process part 25. The brightness component image data Y is not thinned out. The thinning out process at the sampling rate of 4:2:2 is performed by the thinning-out part 25 according to a thinning out method illustrated in FIG. 5B.

For example, as illustrated in FIG. 16, the RGB image data in VGA image size is converted into the brightness component image data Y and the color difference component image data Cb, Cr, and then, by the thinning out at the sampling format of 4:2:2, the brightness component image data Y is passed through to be the VGA size without thinning out, and a data size of the color difference component image data Cb, Cr is compressed to be a smaller data size corresponding to an image size of a height of 480 pixels and width of 320 pixels. The color difference component image data Cb, Cr in the smaller data size corresponding to the image size of a height of 480 pixels and width of 320 pixels is transmitted to the frame memory SDRAM temporally.

Next, in the noise reduction operation mode, only the color difference component image data Cb, Cr read out from the frame memory SDRAM are processed by the low-pass filter, i.e. the filter 24, with a window size of 5×5 in horizontal and vertical directions, and then are re-sampled according to a sampling method illustrated in FIGS. 5A and 5C by the resize part 28, and are compressed to image data in a small data size, being ½ size both in the horizontal and vertical directions, namely ¼ size in all, corresponding to an image size of height 240 and width 160, and then written into the frame memory SDRAM by the resize part 28 once. Next, the compressed image data in the small data size corresponding to the compressed image size written into the frame memory SDRAM is read out and processed by the low-pass filter, i.e. the filter 24, with the window size of 5×5 in the horizontal and vertical directions and expanded to a double size both in the horizontal and vertical directions, namely 4 times in all by the resize part 28 (S.48).

After that, the data is saved into the memory card 33 or the like (S.50) as a compressed JPEG file (S.49) with the thinning out rate 4 of :2:2 as well as the normal photographing.

According to the present embodiment, at expanding, since the process by the low-pass filter with the size of 5×5 in the horizontal and vertical directions is performed and expanded to the double size both in horizontal and vertical directions, namely 4 times in all, it is equal to that of the low-pass filtering is performed on an amount of 10×10 data, so it is possible to obtain the deletion effect on the low frequency color noise (color noise with a large graininess) which is not removable by the window with the size being 5×5.

That is to say, according to the present embodiment, it is possible to obtain a color noise reduction effect on the low frequency color noise by adding only just an scaling process of the color difference component image data Cb, Cr, without increasing the thinning out rate on the noise reduction operation mode, and without requiring a special hardware for exclusive use.

In a case of a noise reduction process illustrated in FIG. 11, there is a possibility of the noise reduction effect changing depending on a playing method in a player side even though a recording process is speedy, but according to an embodiment illustrated in FIG. 15, there an advantage of obtaining an equal effect of the noise reduction effect as illustrated in FIG. 11 independent of the playing method in the player side.

CROSS-REFERENCE TO THE RELATED APPLICATION

This application is based on and claims priority from Japanese Patent Application No. 2006-75778, filed on Mar. 20, 2006, the disclosure of which is incorporated herein by reference in its entirety.

What is claimed is:

1. A method for removing color noise on a slowly varying component contained in color difference component image data of image data which is imported from an image sensor and is converted to brightness component image data and the color difference component image data, comprising the steps of:
   determining whether it is necessary to perform a color noise removal process on the slowly varying component;
   when, in the determining step, it is determined that it is not necessary to perform the color noise removal process, sampling pixels of said color difference component image data by thinning out according to a first defined sampling format;
   when, in the determining step, it is determined that it is necessary to perform the color noise removal process, sampling pixels of said color difference component image data by thinning out according to a second defined sampling format, wherein the second defined sampling format is obtained by switching the sampling rate of the first defined sampling format such that the color difference component image data is produced in a small data volume corresponding to a compressed image data size smaller than image data size without said color noise removal process; and
   recording said color difference component image data and said brightness component image data.

2. The method according to claim 1, wherein the step of sampling pixels of said color difference component image data involves thinning out a peripheral pixel of a target pixel among pixels of said color difference component image data according to the second defined sampling format while maintaining the target pixel.

3. The method according to claim 2, wherein the step of sampling pixels of said color difference component image data involves producing the target pixel by using color difference image data of a plurality of pixels among pixels of said color difference component image data according to the second defined sampling format so as to allow the peripheral pixel thereof to be thinned out.

4. The method according to claim 1, further comprising the step of, between the steps of sampling with the second defined sampling format and recording:
   scaling an image size of the color difference component image data, being in the small data volume corresponding to said compressed image size, to said image size of the color difference component image data without said color noise removal process.

5. The method according to claim 4, further comprising the step of, between the steps of sampling with the second defined sampling format and scaling:
   filtering the color difference component image data from the step of sampling with the second defined sampling format to remove the color noise on the slowly varying component.

6. A method for removing color noise on a slowly varying component in contained in color difference component image data of image data imported from an image sensor in which said image data is converted to brightness component image data and the color difference component image data, comprising the steps of:
   sampling pixels of said color difference component image data by thinning out according to a defined sampling format;
   determining whether the color noise removal process it is necessary to perform a color noise removal process; and
   when, in the determining step, it is determined that it is necessary to perform the color noise removal process, performing the following steps:
   producing the color difference component image data in a small data volume corresponding to a compressed image data size smaller than an image data size without said color noise removal process;
   filtering the small data volume color difference component image data from the step of producing, to remove the slowly varying component thereof; and
   scaling the color difference component image data from the step of filtering to an intact previous image size.

* * * * *